Figure 1:
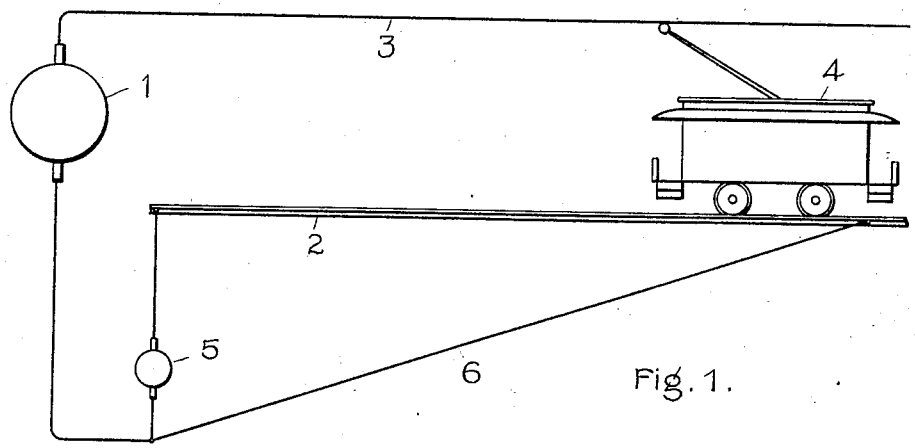

No. 652,187. Patented June 19, 1900.
S. KROHN.
SYSTEM OF ELECTRICAL DISTRIBUTION.
(Application filed Nov. 2, 1899.)

(No Model.)

Witnesses.
Lewis P. Abell.
Benjamin B. Hull.

Inventor
Sigvald Krohn.
by Albert G. Davis
Atty.

THE NORRIS PETERS CO., PHOTO-LITHO., WASHINGTON, D. C.

UNITED STATES PATENT OFFICE.

SIGVALD KROHN, OF BERLIN, GERMANY.

SYSTEM OF ELECTRICAL DISTRIBUTION.

SPECIFICATION forming part of Letters Patent No. 652,187, dated June 19, 1900.

Application filed November 2, 1899. Serial No. 735,561. (No model.)

*To all whom it may concern:*

Be it known that I, SIGVALD KROHN, a subject of the King of Sweden and Norway, residing at Berlin, Germany, have invented certain new and useful Improvements in Systems of Electrical Distribution, (Case No. 1,268,) of which the following is a specification.

This invention relates to electric circuits in which the earth forms a portion of the circuit, and particularly to electric-railway circuits, where the rails form part of the return-circuit. In such systems varying differences of potential exist at different points of the rail-circuit both by reason of the inherent resistance of the rail or earth return branch and by reason of the varying load imposed by fluctuations of traffic. Such differences of potential tend to develop stray currents, ordinarily called "earth-currents," spreading outwardly from the conductor through the earth in a loop, connecting points of different potential and creating considerable annoyance. These currents not only affect other conductors traversing the neighborhood of the points of different potential, but corrode pipes or other metallic bodies buried in the earth in the path of the disturbance. My invention provides for a reduction of the differences of potential at different parts of the return-circuit and is carried out by the interposition of a counter-electromotive-force device between the station end of the rail branch and the generator and an auxiliary feeder connected from the "ground" side of the generator to the rail branch at a point or points distant from the station where the difference of potential may be sufficiently greater than that at the station end to cause trouble from the causes above noted. A satisfactory type of such counter-electromotive-force device may be an electric motor, which being interposed in the return-circuit will vary in speed with the load of the section it protects. This motor may be employed to drive an auxiliary generator or booster to raise the potential in the positive feeder of the section protected, thereby promoting a greater economy in the operation of the system of distribution. The best results are obtained when the counter electromotive force of the motor plus its $C^2R$ loss equals the $C^2R$ loss of the negative feeder, connecting the distant part of the track-circuit with the generator. The motor should be separately excited to render its speed directly variable with the load on the system, so that if a heavy current return through a negative feeder the motor will draw a correspondingly-heavy current and generate a counter electromotive force about equal to the drop in the feeder, and, inversely, if a small current be flowing in the feeder a small current will be drawn by the motor, and a small drop in the feeder will be counterbalanced by the small counter electromotive force of the motor. The action of the motor lowers the difference of potential between the points of the track included in its circuit, and thus cuts down the stray currents through the earth. The generator should not be directly grounded at the station.

The features of novelty of my invention will be more specifically described hereinafter and will be definitely indicated in the claims.

Figure 2:
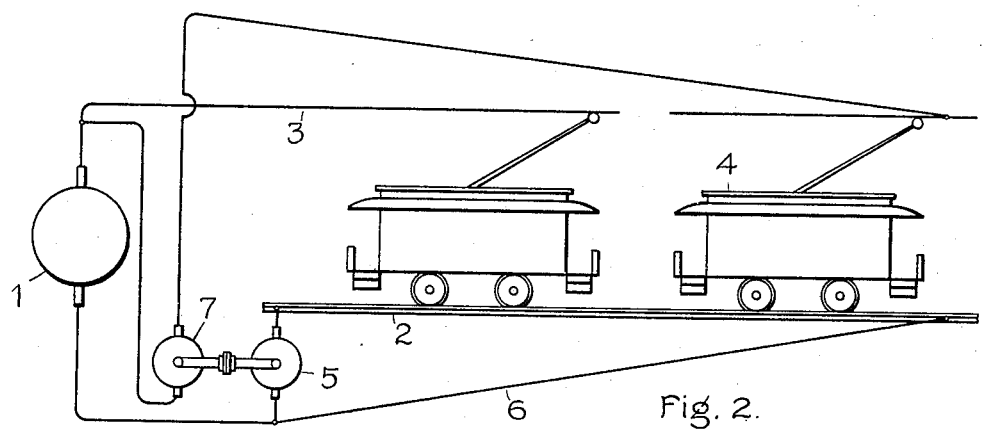
Figure 3:
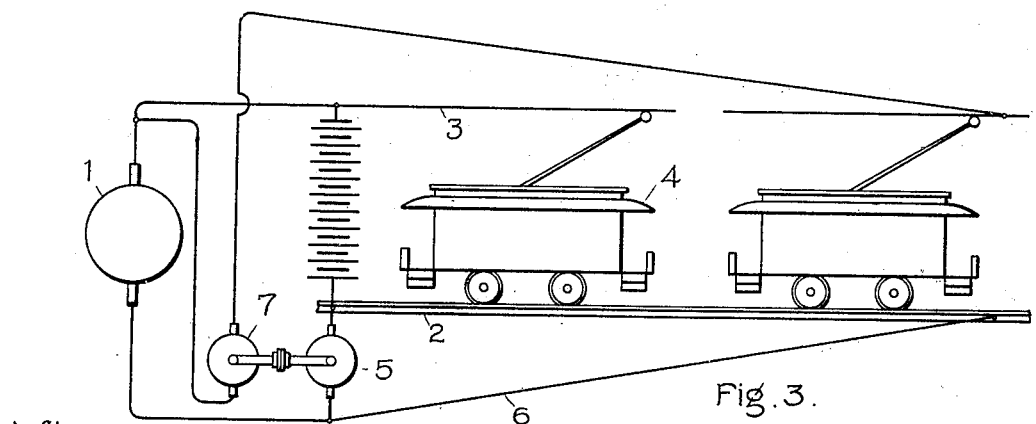

In the accompanying drawings, which illustrate my invention, Figure 1 is a diagram of a system wherein a simple counter-electromotive-force device, such as a motor, is employed to counteract earth-currents. Fig. 2 is a diagram of a system in which the power developed by this motor is employed to operate a booster feeding the positive side of the system. Fig. 3 is a similar organization in which the generating-station is equipped with a storage battery for economizing power.

Referring first to Fig. 1, 1 represents a generator located at a supply-station and furnishing power for a circuit, including a rail branch 2. 3 represents an overhead trolley-wire or other insulated conductor leading from the station to the points along the line to which current is to be delivered, and 4 represents part of the load, such as a trolley-car or other shifting load on the system. The differences of potential in the rail branch 2 at different points thereof depend on its resistance and on variations of load and changes of position of the cars. The resistance of the conductor is a fixed condition, depending upon the installation; but in all cases where no provision is made to guard against it sufficient difference of potential exists between terminal points of a track-section, such as 2, and the earth to set up earth-currents in the neighborhood. The value of these differences of potential depends upon the drop over the return branch 2. I interpose a source of counter electromotive force 5 between the end of the track-section nearest the station and the generator and connect an auxiliary feeder, which may be styled a "negative feeder," between the remote end of the track-section and the generator, as indicated at 6. This motor absorbs part of the drop over the return branch, and thereby lowers the drop between the terminals of the section 2, and its counter electromotive force tends further to equalize the potential at the terminals of the rail-section 2. The best conditions are obtained with a separately-excited field for the motor, so adjusted as to enable the counter electromotive force to balance the drop of voltage in the negative feeder 6. A separate negative feeder and motor, such as 6, may be employed for each track-section of the system.

In the organization shown in Figs. 2 and 3 the energy developed by the motor is employed to raise the potential of the positive feeder leading to the same point of the line as the negative one which connects with the motor. The motor may be belted or otherwise mechanically connected with an auxiliary generator or booster 7, which is interposed in series relation between the generator and the positive feeder of the control-station. In Fig. 3 a similar organization is shown in a system where a storage battery in shunt to the generator is used to more economically operate the station. In these organizations, where the positive feeder leads to the same point of the line as the negative one, the current in both is about the same, and therefore the booster, which for the best results should be provided with a separately-excited field, always gives the motor a proper load and economizes the operation of the system, at the same time generating potential proportiontial to the drop in the feeder in which it is connected.

What I claim as new, and desire to secure by Letters Patent of the United States, is—

1. The combination with an electric circuit having an earth-return, of means for preventing stray earth-currents, comprising a counter-electromotive-force device between the low-potential end of the earth branch and the generator.

2. The combination with an electric circuit having an earth-return, of means for preventing stray earth-currents comprising a source of opposing electromotive force in the circuit at the low-potential end of the earth branch to raise its potential.

3. In a system of electrical distribution having a partial earthed circuit, means for preventing stray earth-currents between different parts of the earth branch, comprising a counter-electromotive-force device between the low-potential end of said branch and the supply-generator and a feeder leading to a point of higher potential in the earth branch.

4. In a system of electrical distribution having a partial earthed circuit, means for preventing stray earth-currents between different parts of the earth branch comprising an electric motor between a low-potential point of the earth branch and the generator, and a feeder leading to a point of higher potential.

5. In a system of electrical distribution having a partial earthed circuit, means for preventing stray earth-currents between different parts of the earth branch, comprising an electric motor in the return-circuit, and a booster driven by said motor to supply a feed-wire.

6. In a system of electrical distribution having a partial earthed circuit, means for equalizing the potential on the earthed conductor, comprising an electric motor in the return-circuit at a low-potential point, a negative feeder connecting the generator with a point of higher potential, and a booster in a positive feeder operated by the motor.

7. In a system of electrical distribution having a partial earthed circuit, means for reducing the drop in the feeders, comprising an electric motor in the earthed branch at a point of relatively-low potential, a negative feeder connecting the generator with a point of higher potential, a booster operated by the motor and connected to a positive feeder for a point of the system corresponding to the point of high potential of the earthed branch.

In witness whereof I have hereunto set my hand this 16th day of October, 1899.

SIGVALD KROHN.

Witnesses:
 WOLDEMAR HAUPT,
 HENRY HASPER.